Inventors:
Evans W. Erikson
Lowell E. Miller
Norbert L. Schmitz
By Hofgren, Brady, Wegner, Allen & Stellman
Attorneys.

Nov. 13, 1962 E. W. ERIKSON ET AL 3,064,189

STATIC FREQUENCY COMPARATOR

Filed Sept. 16, 1959 3 Sheets-Sheet 2

Inventors:
Evans W. Erikson
Lowell E. Miller
Norbert L. Schmitz
By Hofgren, Brady, Wegner, Allen & Stellman
Attorney Nov. 13, 1962 E. W. ERIKSON ET AL 3,064,189

STATIC FREQUENCY COMPARATOR

Filed Sept. 16, 1959 3 Sheets-Sheet 3

Inventors:
Evans W. Erikson
Lowell E. Miller
Norbert L. Schmitz
By Hofgren, Brady, Wegner, Allen & Stellman, Attorneys 3,064,189

STATIC FREQUENCY COMPARATOR

Evans W. Erikson and Lowell E. Miller, Rockford, Ill., and Norbert L. Schmitz, Madison, Wis., assignors to Sundstrand Corporation, a corporation of Illinois Filed Sept. 16, 1959, Ser. No. 840,439
14 Claims. (Cl. 324—79)

This invention relates to a static frequency comparator and more particularly to a frequency control system which utilizes a static circuit for comparing the frequency of a generated signal with the frequency of a reference signal.

There are two basic types of frequency control systems, as for power generators. In one, the generated frequency is coupled to a tuned circuit and when it differs from the frequency desired an output signal is derived, the amplitude and phase with respect to the generated frequency are functions of the frequency deviation. A principal objection to this type of frequency control is the difficulty in maintaining the resonant frequency of the tuned circuit constant with changes of temperature, humidity and aging of the circuit components.

The other frequency control system compares the generated frequency with the frequency of a standard, as a tuning fork oscillator. This system requires integration of the error between the generated and reference signals and usually uses a mechanism having moving parts in the performance of the comparing and integrating operations. For example, copending Erikson application, Serial No. 600,091 filed July 25, 1956, and assigned to the assignee of this invention, now Patent 2,900,527, issued August 18, 1959, shows a system in which the generated and reference signals drive synchronous motors which in turn dirve a mechanical differential comparator. A major objection to this system is that it incorporates moving parts which wear and require maintenance.

A principal object of the present invention is the provision of a controlled frequency system of the frequency comparator type which utilizes neither moving parts nor critical tuned circuits. The generated and reference signals are compared by a circuit which is sensitive to the instantaneous difference in phase between the two signals. When there is a difference between the generated and reference frequencies, the phase difference between the signals is constantly changing and varies from 0° to 360°. In order to make use of a phase comparator in a frequency control system having a response time which is long with respect to the period of the system frequency, the phase differential of the compared signals must be maintained within predetermined limits.

One feature of the invention is that it includes a phase comparator for comparing the phase of the generated and reference signals, together with means for modifying at least one of the signals to maintain the phase differential between them within predetermined limits.

Another feature is that the signal modifying means shifts one of the signals, preferably the one lower in frequency, 180° in phase each time the signals occur in phase synchronism, maintaining the same condition of phase lead or lag between the signals. A further feature is that the system include a frequency divider for each of the signals, ahead of the phase comparator, and means are provided for modifying the signal ahead of the frequency divider, resulting in a shift of 180° in the signals that are compared.

Another feature is the provision in the system of means for converting the generated and reference signals to a series of pulses which are then compared in a phase comparator yielding an output signal which has a polarity that is a function of the direction of frequency difference, i.e. lead or lag, between the pulses. Yet a further feature is that a feedback circuit is connected from the output of the phase comparator to the input of the frequency divider circuit, and a pulse is derived from the comparator output when the signals to the comparator are in phase synchronism which is coupled through the feedback circuit cancelling a signal pulse at the input and effecting the desired 180° phase shift of the compared signal.

And another feature is that the phase comparator has a rectangular output signal, the width of pulses of which vary as a function of the phase differential of the pulses being compared, and an integrator circuit is connected with the comparator for converting the rectangular output wave form to a unidirectional signal of varying amplitude.

A further feature of the invention is the provision of a method for comparing the frequency of a generated signal with that of a reference signal which comprises comparing the phase of the generated and reference signals and shifting one of the signals in phase periodically to keep the phase differential within predetermined limits.

Further objects and advantages will become apparent from the following detailed description taken in connection with the accompanying drawings, in which.

Figure 1:
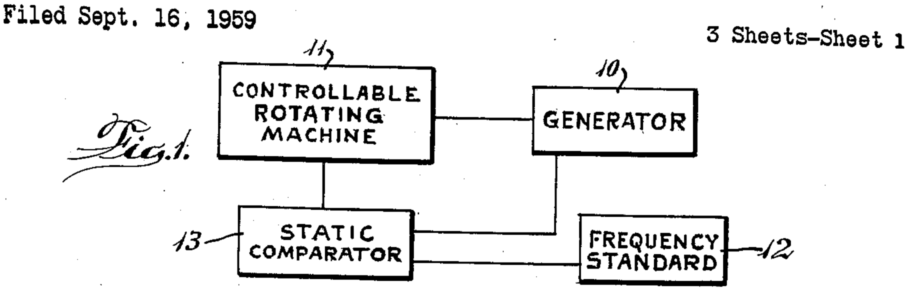
FIGURE 1 is a basic block diagram of a controlled generating system.

While this invention is susceptible of embodiments in many different forms, there is shown in the drawings and will herein be described in detail an embodiment of the invention with the understanding that the present disclosure is to be considered as an exemplification of the principles of the invention and is not intended to limit the inventon to the embodment illustrated. The scope of the invention will be pointed out in the appended claims.

The problem of controlling the frequency of the generated signal is found in many systems from electronic oscillators to rotating machinery utilized in the generation of power. The system disclosed herein will be described in connection with and is particularly designed for use in controlling the frequency of a power generator driven from a variable speed mechanical power source. Specifically, the frequency comparator is intended for use in a constant speed drive system for a generator driven from the engine of an aircraft. In the electric system of most multi-engine aircraft several generators are provided, one driven from each of the aircraft engines and the outputs of the generators are connected with the power distribution system of the aircraft, preferably through suitable load division circuitry, to supply the necessary electrical power. The speed of rotation of each engine may vary widely depending upon the flight condition of the aircraft, i.e. whether it is taking off, climbing, cruising or descending. In many cases the speed of each of the engines is not the same. In order that the electrical equipment on the aircraft function properly, the frequency of the generated electrical power, usually 400 cycles, must be maintained with a relatively high degree of accuracy regardless of the variation in the speed of the engines.

Turning now to FIGURE 1 of the drawings, the basic frequency control system is illustrated in block form. A generator 10 is driven by a controllable rotating machine 11; and frequency standard 12 provides a reference signal which is maintained constant with a desired degree of accuracy. Static comparator 13 compares the frequency of generator 10 with the frequency of the signal from reference 12 and when the frequencies of the two signals differ delivers a correcting signal to controllable rotating machine 11, changing its speed and returning the generated signal to the desired frequency.

Figure 2:
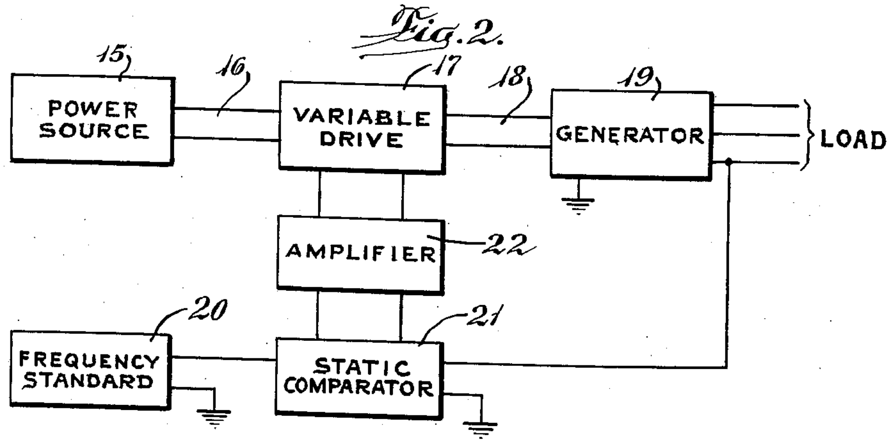
FIGURE 2 is a more detailed block diagram thereof.

A more detailed representation of a generating system is given in FIGURE 2. A power source 15, which may be the propulsion engine of an aircraft, is connected through a shaft 16 with a variable speed drive 17 which may be of the type illustrated in Sadler et al. Patent 2,803,112, issued August 20, 1957. The output of variable speed drive 17 is connected through shaft 18 with a three-phase generator 19. Frequency standard 20 produces a reference signal which, together with a signal from generator 19, is connected to static comparator 21. In static comparator 21 the generated and reference signals are compared, and a control signal derived which is representative of the difference in frequency between the generated and reference signals. The signal from static comparator 21 is coupled through an amplifier 22 with variable speed drive 17, controlling the power delivered from shaft 16 to shaft 18, the speed of generator 19 and the frequency of the generated signal.

Figure 5:
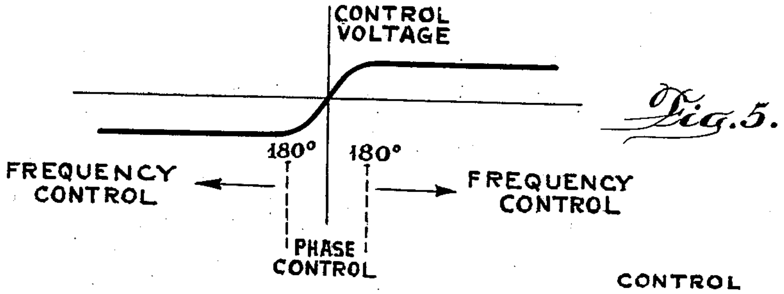
FIGURE 5 is a curve representing the output of a simple phase discriminator.
Figure 6:
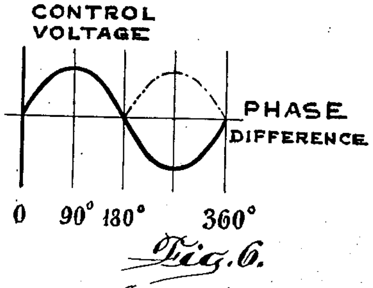
FIGURE 6 is a curve representing the average amplitude of a control signal from a phase discriminator.

A phase comparator compares the time relationship of two signals and has an output signal which is representative of the phase differential in degrees between the signals. As shown graphically in FIGURE 6, the output voltage of a phase comparator may have a sine wave variation, as the phase differential between the two signals changes, starting from zero when the signals are in synchronism to a maximum when they are 90° out of phase, back to zero where they are 180° out of phase and to a maximum of the opposite sense at 270°. A signal of this sort cannot be used directly in a frequency control system of slow response, one which cannot correct a frequency difference in a time less than the period of a half cycle, as its average value is zero. Accordingly, it is desirable to limit the operation of the phase comparator at least to a phase difference of 180°, and preferably to the region from zero to 90° of phase differential, so that the output or control potential does not reverse in sign. An example of a satisfactory control voltage curve is illustrated in FIGURE 5 where phase control is provided in a region adjacent phase synchronism of the signals (which occurs at the origin of the coordinates) and frequency control is provided where the differential between the signals exceeds 90°. This may be accomplished with a phase comparator circuit having the characteristic of FIGURE 5 in which the signals being compared are modified to maintain a maximum phase difference of 90°.

Figure 3:
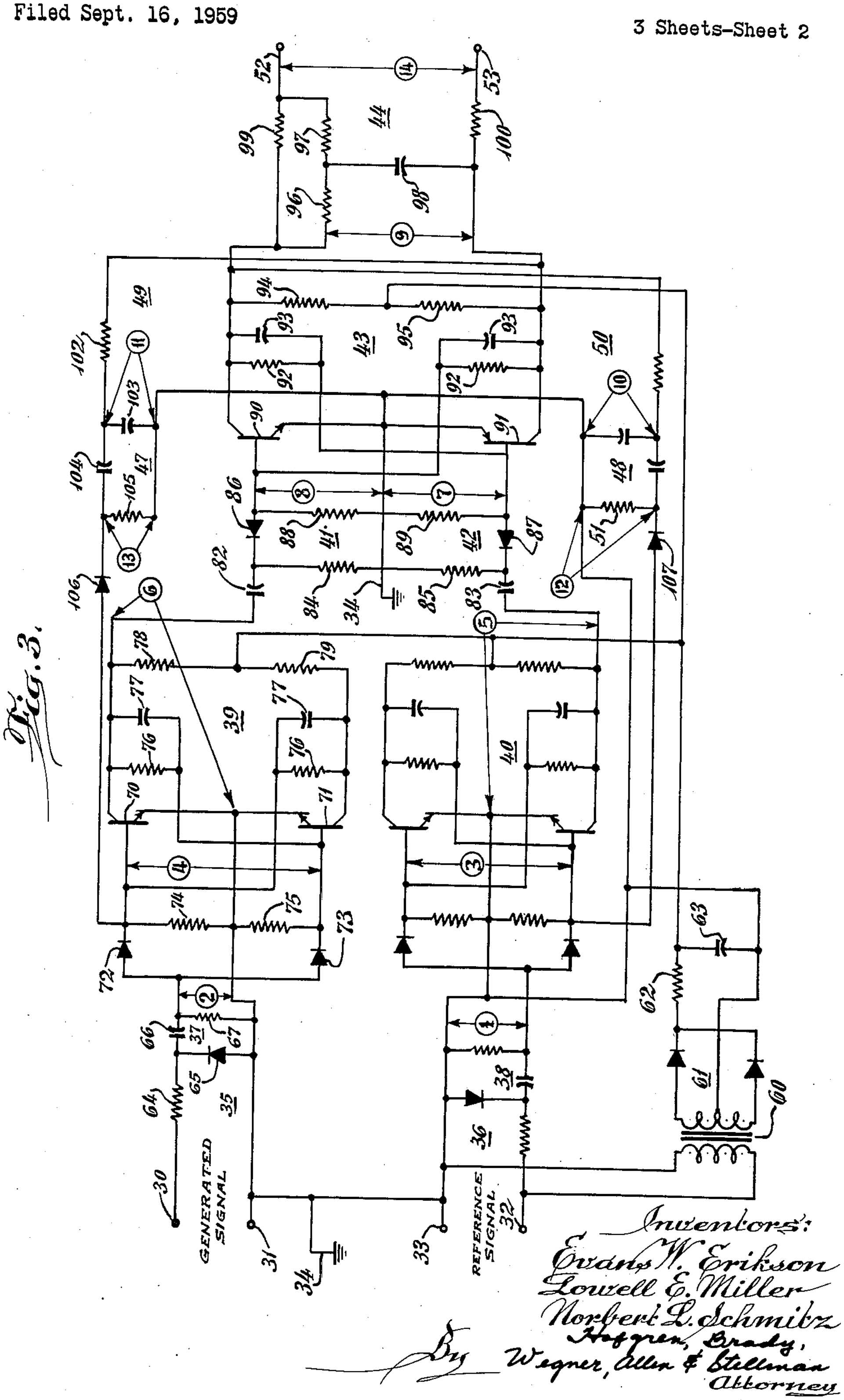
FIGURE 3 is a schematic circuit diagram of the embodiment of the invention.
Figure 4:
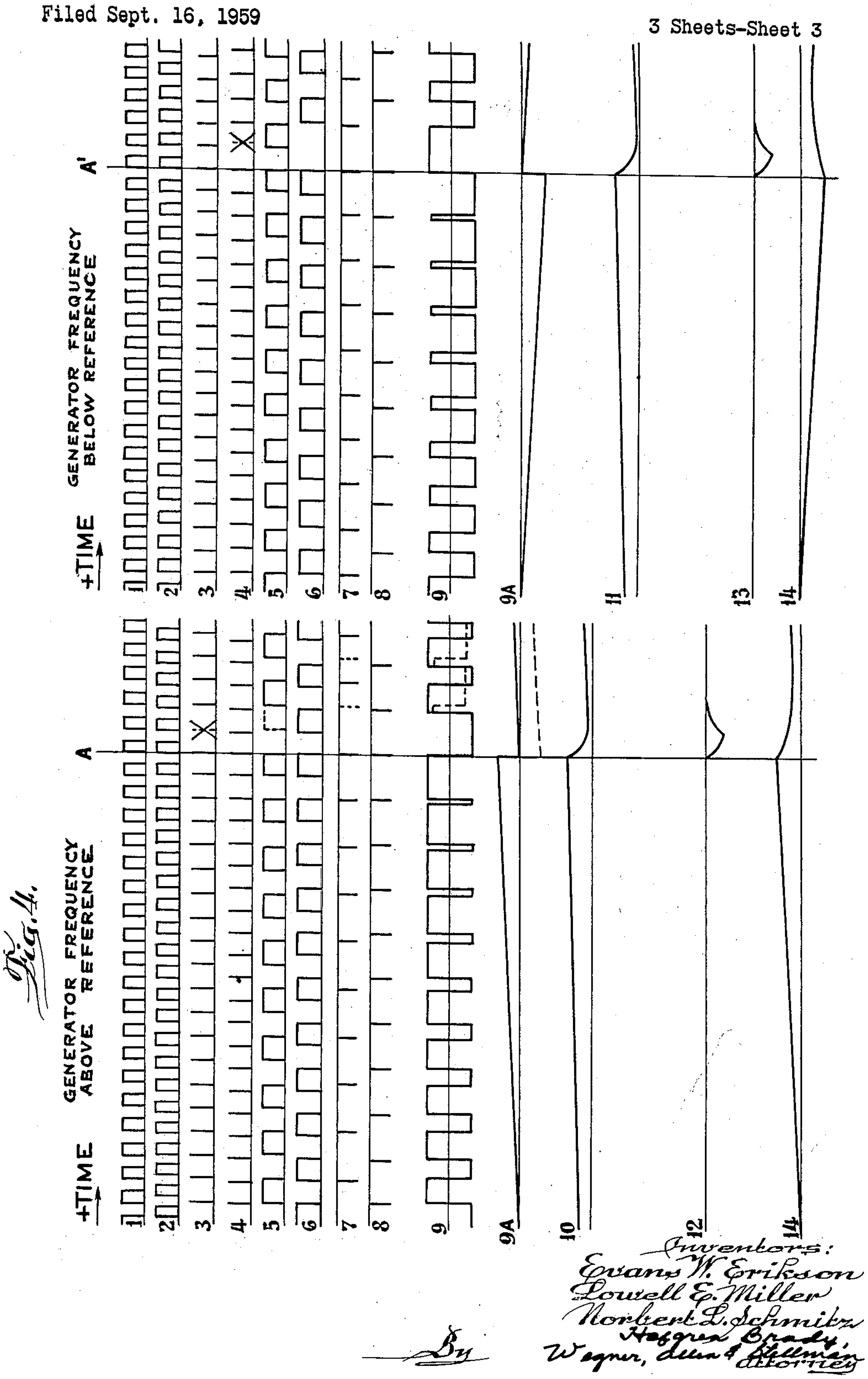
FIGURE 4 is a series of curves representing idealized voltages at various points of the circuit of FIGURE 3.

Turning now to FIGURE 3 of the drawings, a phase comparator circuit which accomplishes this will be described, and its operation related to the wave forms of FIGURE 4. The curves of the left portion of FIGURE 4 are for a condition of generator frequency above the reference frequency and the curves of the right portion illustrate a condition of generator frequency below the reference frequency. The numbers designating individual curves correspond with circled numbers in FIGURE 3 indicating the points at which the illustrated curves appear. The wave forms of FIGURE 4 are idealized, with only those portions of the waves which are utilized in the circuit being shown.

The generated and reference signals, both of which may comprise sine waves, from the generator and reference signal sources are connected with terminals 30—31 and 32—33, respectively, with terminals 31 and 33 being returned to a common reference potential or ground 34. The generated and reference signals are passed through clipping networks 35 and 36, respectively, which derive from the sine waves a train of positive pulses as shown on lines 2 and 1, respectively, of FIGURE 4. The positive pulses from networks 35 and 36 are differentiated in networks 37 and 38, yielding a series of positive pulses corresponding with the leading edges of the rectangular wave trains 2 and 1, and illustrated at 4 and 3, respectively, in FIGURE 4. The positive pulses representing the generated and reference signals trigger bi-stable transistor switching circuits 39 and 40, respectively, which are so arranged that one of the transistor elements therein is always conducting and the condition of the circuit is reversed with each positive pulse. The outputs from the circuits 39 and 40 each comprises a train of rectangular waves (curves 6 and 5, respectively) in which the leading and trailing edges of the pulses correspond with successive leading edges of the rectangular waves 2 and 1. Thus the frequency of the rectangular waves 5 and 6 is one-half that of the reference and generator signals.

The half frequency generated and reference signals from bi-stable switching circuits 39 and 40 are coupled to circuits 41 and 42, respectively in which the rectangular waves are differentiated and the positive going pulses representing the leading edges of the rectangular waves blocked, a series of negative pulses corresponding with the trailing edges of the signals 6 and 5 appearing at 8 and 7.

The negative going half frequency pulses trigger a third bi-stable switching circuit 43 which serves as a phase comparator. The output of phase comparator 43 comprises a series of rectangular pulses (curve 9) of varying width. The positive going sides of the waves are triggered by the generator signal pulses 8 and the negative going sides by the reference signal pulses 7. This series of rectangular waves is integrated in the network 44 and a control potential suitable for actuating a variable speed drive appears at 14.

In the left portion of FIGURE 4 the wave trains and pulses indicate a condition in which the generator signal frequency is higher than the reference signal frequency. Referring particularly to lines 1 and 2 it will be seen that the rectangular waves of line 2 occur progressively earlier in point of time than the corresponding waves of line 1, which represent the reference. Similarly, the pulses of line 4 occur progressively earlier than those of line 3. The same relationship is illustrated in lines 5 and 6 which represent rectangular waves at half the reference and generator frequency; and in lines 7 and 8, the negative pulses corresponding with the trailing edges of the rectangular waves of lines 5 and 6. An examination of the wave of line 9, the output of phase discriminator 43, shows that the area under the positive portion of the curve becomes increasingly greater than the area under the negative portion of the curve as the wave from the generator moves ahead of that from the reference. The curve 9A, which is an average of curve 9, shows a gradually increasing positive potential.

In the right portion of FIGURE 4, the generator signal frequency is below the reference signal frequency and the time relationships of the waves and pulses are reversed. Curves 9 and 9A are predominantly negative.

In order to appreciate the necessity for the phase shifting provision made in the circuit, the operation without it will first be considered, with reference to the pulses illustrated in broken lines in the left portion of FIGURE 4. As pointed out above, the positive-going sides of phase comparator output pulses 9 correspond with the negative pulses 8 derived from the generated signal while the negative-going sides of the pulses of wave 9 correspond with the negative pulses 7 derived from the reference signal. At vertical line A the signals are in synchronism, and pulses at 7 and 8 coincide, with pulse 7 triggering the negative-going side of wave 9. The next negative-going pulse to occur is in line 8, derived from the generator signal, causing the wave 9 to go positive. Assuming that the broken line pulses shown in lines 3, 5 and 7 are present, the negative pulse in line 8 is followed very closely by the broken line negative pulse in line 7, from the reference signal, causing the wave 9 to reverse polarity and go negative. With the broken line pulses present in line 7, the solid line pulses shown would be eliminated as the pulses in line 5 are displaced 180° to the left. Accordingly, the wave 9 would remain negative until the positive-going side of the wave is triggered by the next generator signal pulse. The effect of this is best seen by reference to the curve 9A. To the left of vertical line A the curve increases linearly in a positive direction with the increase in positive area of curve 9. With the operation described in connection with the broken line showing to the right of line A, curve 9A would go as far negative as it was positive just to the left of the line, as indicated by the broken line curve; and the average output of the circuit would be zero, with a frequency difference between the generator and reference signals. Accordingly, it is necessary that one of the triggering signals be modified in such a manner that the wave 9 retains its predominantly positive character.

Returning again to FIGURE 3, a pair of feedback circuits 47 and 48 are connected between the output of phase discriminator 43 and the input circuits to bi-stable switching networks 39 and 49, respectively. More specifically, feedback network 47 is connected between that portion of phase comparator circuit 43 triggered by the reference signals and the bi-stable frequency divider circuit 39 associated with the generator signals; and feedback circuit 48 is connected from that portion of the phase comparator 43 associated with the generator signal to the input of frequency divider 40 in the reference signal channel. The two feedback channels are alternately utilized, depending upon the relationship of the generator and reference frequencies.

In the example discussed above where the generator frequency is above that of the reference, the output wave 9 of the phase comparator 43 is impressed on the feedback channel 48 and integrated in network 50, the signal 10 appearing across the output of the integrator circuit. The signal is then passed through a differentiator network 51, producing a negative pulse immediately to the right of line A, and corresponding with the negative-going exponential portion of curve 10 as illustrated in curve 12. This negative pulse is coupled to the bi-stable switching circuit 40 biasing the circuit in a nonconductive condition and effectively cancelling the first pulse (shown with an "X" through it in line 3) in the reference frequency circuit following the point of synchronism of the two signals. This eliminates the corresponding broken line waves or pulses of curves 5, 7 and 9A. With the first pulse of the lower frequency signal following the point of synchronism eliminated, the wave 9 which was triggered in the positive direction by the pulse from the generator signal of line 8, remains positive until it is triggered in the negative direction by the first solid line reference signal pulse of line 7, which corresponds with the leading edge of the third pulse of line 1 following the point of synchronism. The solid line curve 9, following the point of synchronism of the signal in line A has a short negative period and then returns to its predominately positive character. Accordingly, the average curve 9A returns to zero at synchronism and then increases linearly again.

As pointed out in the introductory portion of this discussion, a phase comparator may be utilized to provide a usable frequency control signal so long as the compared signals maintain less than a 180° phase difference regardless of the response time of the system. It has been demonstrated that the polarity of the comparator output or control potential reverses after the signals are in synchronism; and in order to provide a usable control signal, one of the compared signals is shifted in phase by 180° following the point of synchronism. The phase shift is accomplished by gating or cutting off a stage of the system, effectively cancelling a portion of the signal.

The integrating circuit 44 connected with the output of phase comparator 43 averages the curve 9 and a control signal shown in curve 14 appears at output terminals 52 and 53. This curve increases its potential in a positive direction until the point of synchronism is reached at line A and then drops slightly along an exponential curve before it begins to rise again.

The curves in the right portion of FIGURE 4 illustrate the opposite condition in which the generator frequency is below the reference frequency. Here, the pulses of line 1 occur progressively earlier in point of time than the pulses of line 2 representing the generator frequency. Pulses of lines 3 and 4 are derived from the leading edges of the rectangular waves of lines 1 and 2, respectively and are utilized to trigger bi-stable switching circuits 40 and 39, establishing the rectangular waves of lines 5 and 6. These waves are then differentiated and the positive pulses blocked forming the pulse trains of lines 7 and 8 which are fed to phase comparator 43. The output wave 9 of the phase comparator has the negative-going sides of the wave triggered by the reference pulses 7 and the positive-going sides of the wave triggered by the generated signal pulses of line 8. Wave 9 becomes increasingly negative as the pulses approach synchronism at line 9A'. A portion of the output of the phase comparator derived across the section which is responsive to the reference signal is integrated at 49, with the curve 11 being developed by the integrator. This curve is differentiated at 47 yielding a negative pulse of line 13 which is coupled to the input of bistable circuit 39 cancelling the first differentiated generator signal pulse following synchronism (X'd out in line 4 of the right portion of FIGURE 4). Following synchronism, the wave of line 9 reverses polarity briefly until it is triggered again in the negative direction by the next negative pulse derived from the reference signal channel. The integrated output of the phase comparator is illustrated in line 14 and comprises a wave whose potential gradually increases in a negative direction until the point of synchronism is reached whereupon it drops exponentially toward zero and then begins to increase again in the negative direction, exactly the oppoiste of wave 14 on the left-hand portion of FIGURE 4.

The output signal appearing across terminals 52 and 53 may be utilized as in the system of FIGURE 2, controlling a variable speed drive to the generator, to maintain the desired generator frequency. With the system in equilibrium it often happens that a control signal to the variable drive is necessary to maintain the desired frequency, and in order to achieve this control signal the system must necessarily operate with the generated and reference signals out of phase with each other which is not objectionable in most power generating systems.

Figure 7:
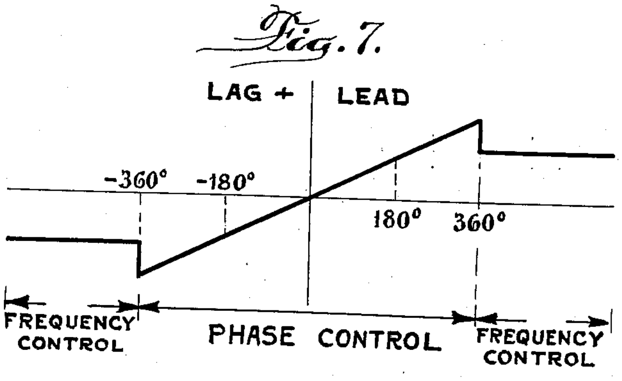
FIGURE 7 is a curve representing the output of the phase discriminator described herein.

FIGURE 7 illustrates the operating characteristic of the system of FIGURE 3. Because of the nature of the bistable phase comparator, phase control is provided in the region between the 360° points and the system may operate in a stable or steady state condition at any point within this region. The control potential has an amplitude directly and linearly related to the angle of phase difference, positive for a leading generator signal and negative for a lagging generator signal. A relatively slow shift in generator frequency may be corrected by the system before the phase difference exceeds 360°. If the generator frequency differs from the reference frequency, by an amount sufficient to cause the phase difference to vary through 360°, the system operates as a frequency control with a constant amplitude of output signal, positive for generator frequency above the reference and negative for generator frequency below.

The specific embodiment of the circuit illustrated in FIGURE 3 will now be described in some detail and values and type designations indicated for various of the elements. It is to be understood that this specific description of the circuit is intended solely to provide a complete disclosure of an operative embodiment of the invention and that many changes will be apparent to those skilled in the art.

The three bi-stable circuits utilized in the system employ transistor switching elements which require a bias potential for operation. This bias potential is derived from the reference signal source through transformer 60 to which is connected a full-wave rectifier 61 with a filter including series resistor 62, 220 ohms, and shunt capacitor 63, 50 $\mu$f.

The generated and reference signal channels are identical and only one of them will be described in detail. Clipping network 35 comprises a series resistor 64, 39,000 ohms, and a shunt connected Zener diode 65, as an 8 volt regulator element type ZA8 sold by Hoffman Electronics, followed by a differentiator network including series capacitor 66, 0.0047 $\mu$f., and shunt resistor 67, 27,000 ohms. Bi-stable switching circuit 39 utilizes a pair of transistors 70 and 71, both Texas Instrument type 2N332, with their emitters connected together and to the reference potential. The pulse signals from clipping network 35 are coupled through diodes 72 and 73, Hughes type HD6007, and across resistors 74 and 75, 27,000 ohms each, with the base elements of the transistors. Commutating networks are coupled between the collector elements of each transistor and base of the other transistor and include parallel connected resistors 76, 47,000 ohms, and capacitors 77, 0.01 $\mu$f. The half-frequency output of bi-stable switching circuit 39 is developed across resistor 78, 20,000 ohms connected between the collector element of transistor 70 and the bias source. A similar resistor 79, 20,000 ohms, is connected between the collector of transistor 71 and the bias source.

The generated and reference half-frequency signals from circuits 39 and 40 are connected through capacitors 82 and 83, 0.002 $\mu$f., which form a portion of differentiator circuits 41 and 42. Shunt resistors 84 and 85 have a value of 12,000 ohms and the positive-going pulses are blocked by diodes 86 and 87, Hughes type HD6007. The trigger pulses for phase comparator 43 are developed across resistors 88 and 89, 12,000 ohms, and are applied to the base electrodes of transistors 90 and 91, Texas Instruments type 2N332. The transistor switching circuit 43 is generally similar with that of circuit 39, commutator networks comprising resistors 92, 22,000 ohms and capacitors 93, 0.001 $\mu$f., being connected from the collectors of each transistor to the base of the other transistor. The load includes resistors 94 and 95, each 10,000 ohms, connected between the collectors.

The output integrator circuit 44 includes a T network having series resistive legs including resistors 96 and 97, each 100,000 ohms, and shunt capacitor 98, 30 $\mu$f. Resistors 96 and 97 are shunted by resistor 99, 470,000 ohms, and an additional series resistor 100, 100,000 ohms, is series connected in the lower portion of the circuit.

The pulse feedback circuits 47—49 and 48—50 are identical and only one will be described. Integrator 49 includes series resistor 102, 100,000 ohms, and shunt capacitor 103, 0.1 $\mu$f. Differentiator circuit 47 includes series capacitor 104, 0.1 $\mu$f., and shunt resistor 105, 100,000 ohms. The feedback blanking pulse is coupled through the appropriate feedback circuit and blocked in the other circuit by diodes 106 and 107, Hughes type HD6007.

We claim:

1. A frequency comparator, comprising: a source of generated signal; a source of reference signal; means for deriving from said generated and reference signals a pair of signals representing the phase of the generated and reference signals; a phase comparator for comparing the phase of said generated and reference signals; and means connected between said comparator and said means for shifting one of said signals substantially 180° in phase, periodically, to maintain the phase differential between said signals within predetermined limits.

2. A frequency comparator, comprising: a source of generated signal; a source of reference signal; a phase comparator for comparing the phase of said generated and reference signals; and means connected with said comparator for shifting the one of said signals having the lower frequency substantially 180° in phase each time the two signals occur in phase synchronism.

3. A frequency comparator, comprising: a source of generated signal; a source of reference signal; means for deriving from said generated and reference signals a pair of signals representing the phase of the generated and reference signals, including a frequency divider connected with each of said signal sources; a phase comparator connected with said frequency dividers for comparing the phase of the divided signals; and feedback circuit means connected between said comparator and said means, operative with a predetermined phase relation of the divided signals for shifting the phase of one of the undivided generated and reference signals, periodically, to maintain the phase differential of the divided signals within predetermined limits.

4. A frequency comparator, comprising: a source of generated signal; a source of reference signal; a frequency divider connected with each of said signal sources; a phase comparator connected with said frequency dividers for comparing the phase of the divided signals; and means connected with said comparator and said sources for modifying one of the generated and reference signals, effecting a 180° shift in the phase of the corresponding divided signal to maintain the phase differential of the divided signals within predetermined limits.

5. A frequency comparator, comprising: a source of generated signal; a source of reference signal; means for deriving from said generated and reference signals a pair of signals representing the phase of the generated and reference signals, including means for converting both the generated and reference signals to a series of pulses; a phase comparator for comparing the phase of said pulses; and means connected between said phase comparator and said signal deriving means for shifting one of said signals substantially 180° in phase, periodically, to maintain the phase differential of said signals within predetermined limits.

6. A frequency comparator, comprising: a source of generated signal; a source of reference signal; means for deriving from said generated and reference signals a pair of signals representing the phase of the generated and reference signals, including means for converting both the generated and reference signals to a series of pulses and a frequency divider connected with each of said signal converting means; a phase comparator connected with said frequency dividers for comparing the phase of the divided pulses; and feedback circuit connected between said comparator and said deriving means operative upon phase synchronism of said divided pulses for eliminating one of the undivided generated and reference pulse signals periodically to maintain the phase differential of the divided pulses within predetermined limits.

7. A frequency comparator, comprising: a source of generated signal; a source of reference signal; means for converting both the generated and reference signals to a series of pulses; a frequency divider connected with each of said signal converting means; a phase comparator connected with said frequency dividers for comparing the phase of the divided pulses; and means connected with said comparator and said signal converting means for modifying one of the undivided generated and reference series of pulses by eliminating one of the pulses thereof, shifting the corresponding divided pulse series substantially 180° in phase.

8. A frequency comparator, comprising: a source of generated signal; a source of reference signal; means for converting both the generated and reference signals to a series of pulses; a frequency divider connected with each of said signal converting means; a phase comparator connected with said frequency dividers for comparing the phase of the divided pulse series; and a feedback circuit connected between the output of said frequency comparator and the input of said frequency divider for modifying one of the undivided generated and reference signals by eliminating one of the pulses thereof, shifting the corresponding divided pulse signal substantially 180° in phase.

9. A frequency comparator, comprising: a source of generated signal; a source of reference signal; a pair of frequency dividing and pulse forming circuits one connected with each of said signal sources and each including a first clipping and differentiating circuit, a frequency divider and a second clipping and differentiating circuit, having a pulse output at a fraction of the input frequency; a phase comparator connected with said circuits for comparing the phase of the pulse outputs of said pair of circuits; and means for shifting one of said pulse outputs substantially 180° in phase periodically to maintain the phase differential of said compared signals within predetermined limits.

10. A frequency comparator, comprising: a source of generated signal; a source of reference signal; a pair of frequency dividing and pulse forming circuits one connected with each of said signal sources and each including a first clipping and differentiating circuit, a frequency divider and a second clipping and differentiating circuit, providing a pulse output at a fraction of the input frequency; a phase comparator connected with said circuits for comparing the phase of the pulse outputs of said pair of circuits; and a pair of feedback circuits connected between the output of said phase comparator and the inputs of said frequency dividing and pulse forming circuits for modifying one of the undivided generated and reference signals by eliminating one of the pulses thereof, shifting the corresponding divided pulse signal substantially 180° in phase.

11. A frequency comparator, comprising: a source of generated signal; a source of reference signal; a pair of frequency dividing and pulse forming circuits one connected with each of said signal sources and each including a first clipping and differentiating circuit, a frequency divider and a second clipping and differentiating circuit, providing a pulse output at a fraction of the input frequency; a phase comparator connected with said circuits for comparing the phase of the pulse outputs of said pair of circuits; a pair of feedback circuits connected between the output of said phase comparator and the input of said frequency dividing and pulse forming circuits for modifying one of the generated and reference signals by effecting a 180° shift in the phase of the divided signals in the phase comparator.

12. A frequency comparator, comprising: a source of generated signal; a source of reference signal; means for deriving from said generated and reference signals a pair of signals representing the phase of the generated and reference signals, including means for converting both the generated and reference signals to a series of pulses; a bi-stable phase comparator having a rectangular output signal which is a function of the phase differential of said pulses; said deriving means to maintain the phase differential of said pulses within predetermined limits; and an integrator circuit connected with said comparator for converting said rectangular signal to a unidirectional control signal.

13. A frequency control system, comprising: a source of generated signal of variable frequency; means for controlling the frequency of said source of generated signal; a source of reference signal; means for deriving from said generated and reference signals a pair of signals representing the phase of the generated and reference signals; a phase comparator for comparing the phase of said derived signals; feedback circuit means connected between said phase comparator and said signal deriving means for shifting the phase of at least one of said signals, periodically, to maintain the phase differential between said compared signals within predetermined limits; and means for deriving from said phase comparator a control signal representative of the frequency difference between said sources and for coupling said control signal to said generated signal control means.

14. A frequency control system, comprising: a source of generated signal of variable frequency; means for controlling the frequency of said generated signal; a source of reference signal; means for converting said generated signal to a series of pulses; means for converting said reference signal to a series of pulses representing the phase thereof; a phase comparator for comparing the phase of said pulses; feedback circuit means connected between said phase comparator and each of said signal converting means, for eliminating a pulse from one of said series to maintain the phase differential between the pulses at said comparator within predetermined limits; and means for deriving from said phase comparator a control signal representative of the frequency difference between said sources and for coupling said control signal to said generated signal control means.

References Cited in the file of this patent

UNITED STATES PATENTS

| | | |
|---|---|---|
| Re. 24,240 | Canfora | Nov. 27, 1956 |
| 2,473,853 | Boykin | June 21, 1949 |
| 2,474,268 | Marchand | June 28, 1949 |
| 2,513,477 | Gubin | July 4, 1950 |
| 2,631,279 | Bollinger et al. | Mar. 10, 1953 |
| 2,714,705 | Volz | Aug. 2, 1955 |
| 2,774,872 | Howson | Dec. 18, 1956 |
| 2,775,700 | Ring | Dec. 25, 1956 |
| 2,858,425 | Gordon | Oct. 28, 1958 |
| 2,923,820 | Liguori et al. | Feb. 2, 1960 |
| 2,946,004 | Frank | July 14, 1960 |
| 2,963,648 | Baskin et al. | Dec. 6, 1960 |

FOREIGN PATENTS

| | | |
|---|---|---|
| 580,360 | Canada | July 28, 1959 |